US012126996B2

(12) United States Patent
Tachibana

(10) Patent No.: US 12,126,996 B2
(45) Date of Patent: Oct. 22, 2024

(54) COMMUNICATION APPARATUS USING DEVICE PROVISIONING PROTOCOL TO SEND OR RECEIVE A COMMUNICATION PARAMETER FOR EXECUTING 802.11R FAST TRANSITION CONNECTION PROCESSING, AND COMMUNICATION METHOD AND STORAGE MEDIUM THEREOF

(71) Applicant: CANON KABUSHIKI KAISHA, Tokyo (JP)

(72) Inventor: Hideaki Tachibana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 17/488,002

(22) Filed: Sep. 28, 2021

(65) Prior Publication Data
US 2022/0022034 A1 Jan. 20, 2022

Related U.S. Application Data

(63) Continuation of application No. PCT/JP2020/010419, filed on Mar. 11, 2020.

(30) Foreign Application Priority Data

Mar. 28, 2019 (JP) ................................. 2019-064363

(51) Int. Cl.
*H04L 9/32* (2006.01)
*G06F 9/4401* (2018.01)
(Continued)

(52) U.S. Cl.
CPC ...... *H04W 12/0433* (2021.01); *G06F 9/4401* (2013.01); *H04W 12/069* (2021.01); *H04W 48/02* (2013.01)

(58) Field of Classification Search
CPC .......... H04W 12/0433; H04W 12/069; H04W 48/02; G06F 9/4401
(Continued)

(56) References Cited

U.S. PATENT DOCUMENTS

2010/0049920 A1* 2/2010 LaFrese .............. G06F 12/0804
711/E12.017
2013/0305332 A1* 11/2013 Narasimhan ...... H04W 36/0038
726/7
(Continued)

FOREIGN PATENT DOCUMENTS

CN 108604961 B * 12/2020 ........... H04B 7/0452
CN 108769058 B * 2/2021 ........... H04L 63/083
(Continued)

OTHER PUBLICATIONS

Part 11: Wireless LAN Medium Access Control(MAC)and Physical Layer(PHY) Specifications Amendment 2: Fast Basic Service Set(BSS) Transition, IEEE Std. 802.11r-2008, IEEE Computer Society, Jul. 2008, p. 53 sec,11A.3.

*Primary Examiner* — Haresh N Patel
(74) *Attorney, Agent, or Firm* — Canon U.S.A., Inc. IP Division

(57) ABSTRACT

Identification information indicates that a communication parameter to be provided in accordance with a Device Provisioning Protocol standard is a communication parameter that allows connection processing compliant with an Institute of Electrical and Electronics Engineers 802.11r standard. The identification information is set in an Authentication and Key Management field, and the communication parameter that allows connection processing compliant with the Institute of Electrical and Electronics Engineers 802.11r standard is provided.

11 Claims, 4 Drawing Sheets

(51) Int. Cl.
  *H04L 29/06* (2006.01)
  *H04W 12/0433* (2021.01)
  *H04W 12/069* (2021.01)
  *H04W 48/02* (2009.01)
  *H04L 29/08* (2006.01)

(58) Field of Classification Search
  USPC .................................................... 380/270
  See application file for complete search history.

(56) References Cited

U.S. PATENT DOCUMENTS

2014/0050320 A1* 2/2014 Choyi ................... H04W 12/06
                                                                      380/270
2017/0295448 A1* 10/2017 McCann ............... H04W 12/04

FOREIGN PATENT DOCUMENTS

| JP | 2015-70571 A | 4/2015 | |
| JP | 2018-42057 A | 3/2018 | |
| JP | 2020072442 A * | 5/2020 | ............ H04W 12/04 |
| RU | 2665064 C1 * | 8/2018 | ......... H04L 63/0853 |

* cited by examiner

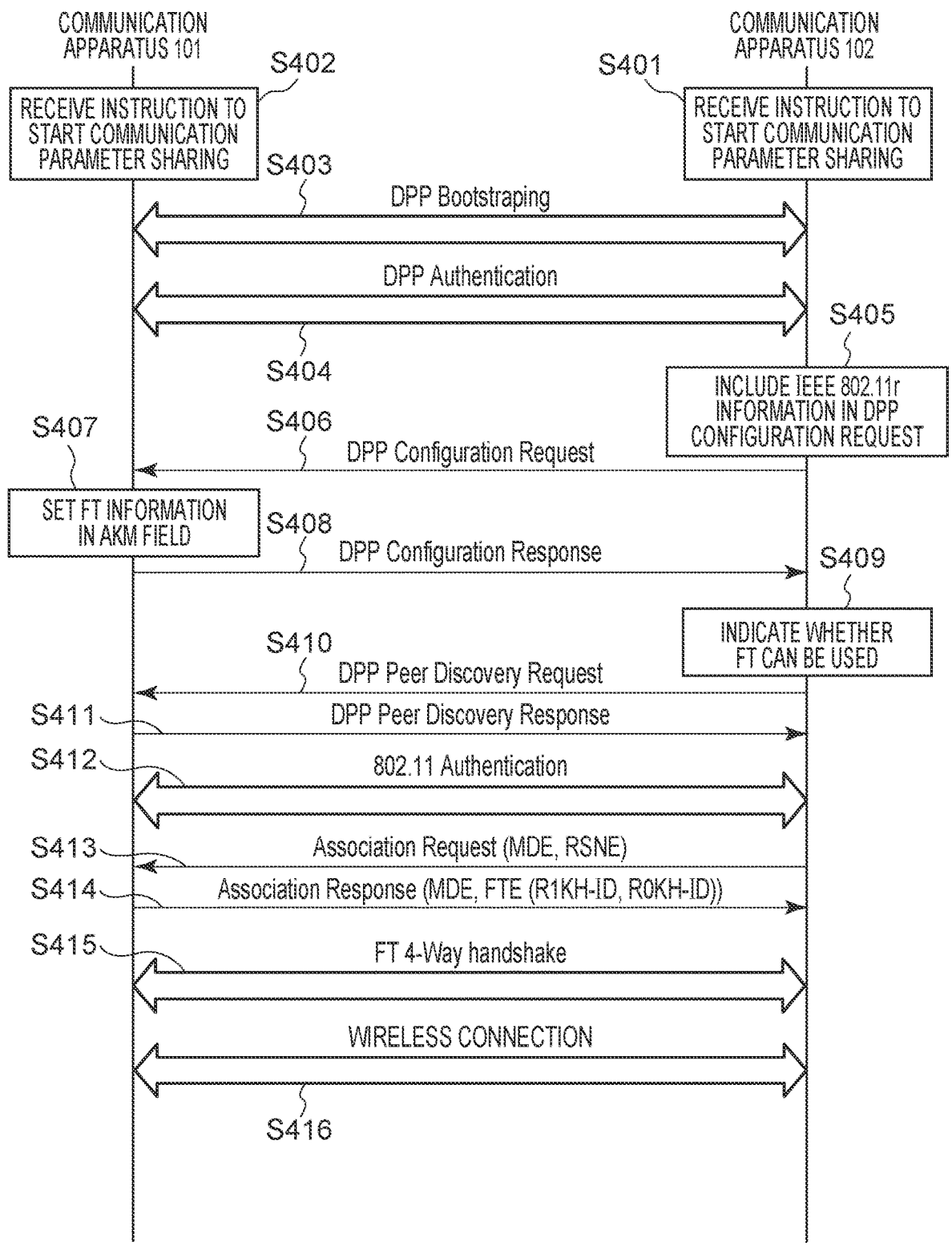

COMMUNICATION APPARATUS USING DEVICE PROVISIONING PROTOCOL TO SEND OR RECEIVE A COMMUNICATION PARAMETER FOR EXECUTING 802.11R FAST TRANSITION CONNECTION PROCESSING, AND COMMUNICATION METHOD AND STORAGE MEDIUM THEREOF

CROSS-REFERENCE TO RELATED APPLICATIONS

This application is a Continuation of International Patent Application No. PCT/JP 2020/010419, filed Mar. 11, 2020, which claims the benefit of Japanese Patent Application No. 2019-064363, filed Mar. 28, 2019, both of which are hereby incorporated by reference herein in their entireties.

BACKGROUND

Technical Field

The present invention relates to an apparatus that performs processing for sharing communication parameters.

Background Art

Recently, a Device Provisioning Protocol (DPP) standard has been developed as a technique that allows sharing of communication parameters for accessing a wireless network. In the DPP standard, an apparatus (called a configurator) provides another apparatus (called an enrollee) with communication parameters (see, e.g., Patent Literature (PTL) 1).

For connection processing without re-authentication for roaming, an Institute of Electrical and Electronics Engineers (IEEE) 802.11r standard defines a fast roaming technique called Fast Basic Service Set Transition (hereinafter also referred to as FT). This connection processing is called FT connection processing.

Under the DPP standard described above, it is not possible to provide communication parameters used in FT connection processing. Also, under the DPP standard, it is not possible to notify the enrollee that communication parameters to be provided can be used in FT connection processing.

Even when the enrollee wants FT connection, FT connection processing cannot be performed. As a result, fast roaming cannot be provided and this may affect user convenience.

CITATION LIST

Patent Literature

PTL 1 U.S. Patent Application Publication No. 2017/0295448.

SUMMARY OF INVENTION

In view of the problems described above, the present invention provides a technique in which, in processing for sharing communication parameters compliant with the DPP standard, communication parameters that allow connection processing compliant with the IEEE 802.11r standard can be shared.

A communication apparatus according to an aspect of the present invention includes a setting unit configured to set first identification information in an Authentication and Key Management field, the first identification information indicating that a communication parameter to be provided in accordance with a Device Provisioning Protocol standard is a first communication parameter allowing connection processing compliant with an Institute of Electrical and Electronics Engineers 802.11r standard; and a transmitting unit configured to transmit a frame to another communication apparatus, the frame including the Authentication and Key Management field having therein the first identification information set by the setting unit and the first communication parameter.

A communication apparatus according to another aspect of the present invention includes a notifying unit configured to notify another communication apparatus of information indicating that the communication apparatus performs connection processing compliant with an Institute of Electrical and Electronics Engineers 802.11r standard; and a receiving unit configured to receive a frame from the other communication apparatus in accordance with a Device Provisioning Protocol standard, the frame including a communication parameter allowing connection processing compliant with the Institute of Electrical and Electronics Engineers 802.11r standard and an Authentication and Key Management field having identification information set therein, the identification information indicating that the communication parameter is a communication parameter allowing connection processing compliant with the Institute of Electrical and Electronics Engineers 802.11r standard.

Further features of the present invention will become apparent from the following description of exemplary embodiments with reference to the attached drawings.

BRIEF DESCRIPTION OF DRAWINGS

FIG. 4 is a sequence diagram illustrating interactions between a communication apparatus 101 and a communication apparatus 102.

DESCRIPTION OF EMBODIMENTS

Figure 1:
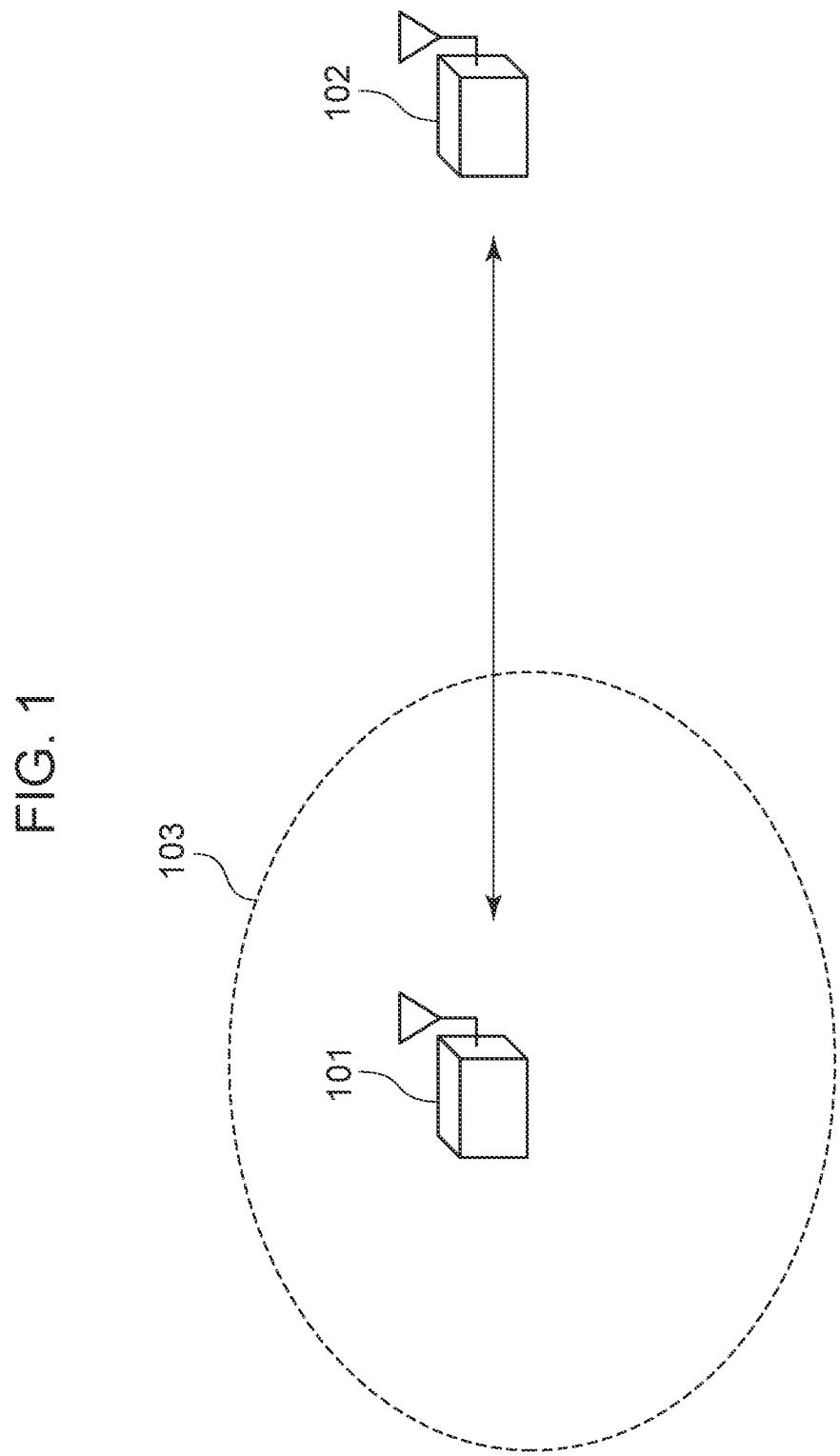
FIG. 1 illustrates a configuration of a communication system.

FIG. 1 illustrates a configuration of a communication system according to the present embodiment.

A communication apparatus 101 operates as an access point, which is a wireless base station, and creates a wireless network 103 for wireless communication compliant with the IEEE 802.11 standard series. Specifically, the communication apparatus 101 periodically transmits a beacon including information about the wireless network 103 (e.g., service set identifier (SSID), which is a network identifier). Also, the communication apparatus 101 receives a connection request from another communication apparatus (second communication apparatus) and allows the second communication apparatus to connect to the wireless network 103.

The communication apparatus 101 operates as a configurator compliant with a Device Provisioning Protocol (DPP) standard developed by the Wi-Fi Alliance. Configurator is an apparatus (providing apparatus) having the role of providing communication parameters required for connection to the wireless network 103. Hereinafter, the DPP standard developed by the Wi-Fi Alliance is simply referred to as "DPP standard".

A communication apparatus 102 operates as an enrollee compliant with the DPP standard. Enrollee is an apparatus (receiving apparatus) having the role of receiving communication parameters provided by the configurator. Here, the communication apparatus 101 provides the communication apparatus 102 (or counterpart apparatus) with communication parameters for the wireless network 103.

Communication parameters include key information, such as netAccessKey, required for connection to the wireless network 103. The communication parameters are not limited to this and may include, for example, a Pre-Shared Key (hereinafter referred to as a PSK) as key information. On the basis of the key information described above, a Pairwise Master Key (hereinafter referred to as a PMK) is generated to allow the communication apparatus 102 to connect to the wireless network 103.

The communication parameters may also include the SSID, which is an identifier of the wireless network 103, and frequency channel information. The communication parameters may also include information, such as an encryption method and an authentication method, used in the wireless network 103, or may include the expiration date of the communication parameters. The communication apparatus 101, which serves as a configurator, provides role information along with the communication parameters. The role information is information indicating whether, after processing for sharing communication parameters is performed, the counterpart apparatus operates as an access point or station compliant with the IEEE 802.11 standard series. If operating as an access point, the counterpart apparatus creates a wireless network using the acquired communication parameters, whereas if operating as a station, the counterpart apparatus connects to a wireless network using the acquired communication parameters. In this example, where the communication apparatus 102 serving as a counterpart apparatus to the communication apparatus 101 operates as a station, the communication apparatus 101 provides role information indicating that the counterpart apparatus operates as a station.

The communication apparatus 102, which operates as a station connecting to a wireless network, connects to the wireless network 103. When connecting to the wireless network 103, the communication apparatus 102 performs connection processing compliant with the IEEE 802.11r standard.

Examples of the communication apparatus 101 and the communication apparatus 102 include, but are not limited to, an access point, a mobile phone, a digital camera, a video camera, a printer, a projector, a personal computer (PC), a personal digital assistant (PDA), a smartphone, and a smartwatch.

The wireless network 103 is a wireless network compliant with the IEEE 802.11r standard. The wireless network 103 may be a network created by an access point other than the communication apparatus 101 and the communication apparatus 102. Even in this case, the communication apparatus 101 still provides communication parameters for connection to the network created by this access point.

The wireless network 103 may be a network created by the communication apparatus 101 or another apparatus, as a Group Owner compliant with a Wi-Fi Direct standard. Even in this case, the communication apparatus 101 still provides communication parameters for connection to the network created by the Group Owner.

The wireless network 103 may be a network compliant with the Wireless Universal Serial Bus (USB), MultiBand OFDM Alliance (MBOA), Bluetooth (registered trademark), ultra-wideband (UWB), Zigbee, or near-field communication (NFC) standard. The UWB includes the Wireless USB, Wireless 1394, and WiNET.

Figure 2:
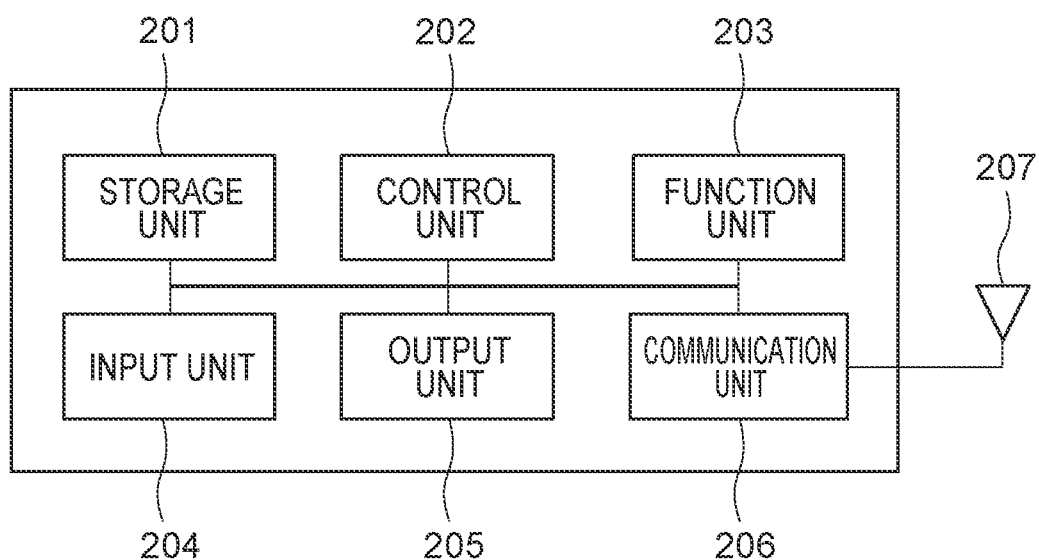
FIG. 2 illustrates a hardware configuration of a communication apparatus.

FIG. 2 illustrates a hardware configuration of the communication apparatus 101. The communication apparatus 102 also has the hardware configuration illustrated in FIG. 2.

A storage unit 201 includes one or more memories, such as a read-only memory (ROM) and a random-access memory (RAM). The storage unit 201 stores programs for performing various operations (described below), and also stores various types of information, such as communication parameters for wireless communication. Besides the memories, such as the ROM and the RAM, a storage medium may be used as the storage unit 201. Examples of the storage medium include a flexible disk, a hard disk, an optical disc, a magneto-optical disc, a compact disc read-only memory (CD-ROM), a compact disc recordable (CD-R), a magnetic tape, a nonvolatile memory card, and a digital versatile disc (DVD).

A control unit 202 includes one or more processors, such as a central processing unit (CPU) and a micro-processing unit (MPU). The control unit 202 executes a program stored in the storage unit 201 to control the entire communication apparatus 101. The control unit 202 may be configured such that the program stored in the storage unit 201 and an operating system (OS) operate in cooperation to control the entire communication apparatus 101. The control unit 202 may include a multi-core processor or multiple processors, by which the entire communication apparatus 101 is controlled.

The control unit 202 controls the function unit 203 to perform predetermined processing, such as image capturing, printing, or projection. The function unit 203 is a hardware component that allows the communication apparatus 101 to perform predetermined processing. For example, when the communication apparatus 101 is a camera, the function unit 203 serves as an image capturing unit and performs image capturing. For example, when the communication apparatus 101 is a printer, the function unit 203 serves as a printing unit and performs printing. For example, when the communication apparatus 101 is a projector, the function unit 203 serves as a projecting unit and performs projection. Data processed by the function unit 203 may either be data stored in the storage unit 201 or may be data received through the communication unit 206 by communicating with another communication apparatus.

The input unit 204 receives various operations from the user. The output unit 205 provides various outputs to the user. The outputs from the output unit 205 include at least one of, for example, display on the screen, audio output from the speaker, and vibration output. The input unit 204 and the output unit 205 may be implemented by a single module, as in the case of a touch panel.

The communication unit 206 controls wireless communication compliant with the IEEE 802.11 standard series and Internet Protocol (IP) communication. Also, the communication unit 206 controls an antenna 207 to transmit and receive radio signals for wireless communication. The communication unit 206 performs wireless connection processing in accordance with an FT initial mobility domain association compliant with the IEEE 802.11r standard. Hereinafter the wireless connection will also be referred to as FT connection.

The communication unit 206 performs wireless connection through DPP Network Introduction using a DPP Connector. The communication apparatus 101 communicates contents, such as image data, document data, and video data, with the communication apparatus 102 using the communication unit 206.

Figure 3:
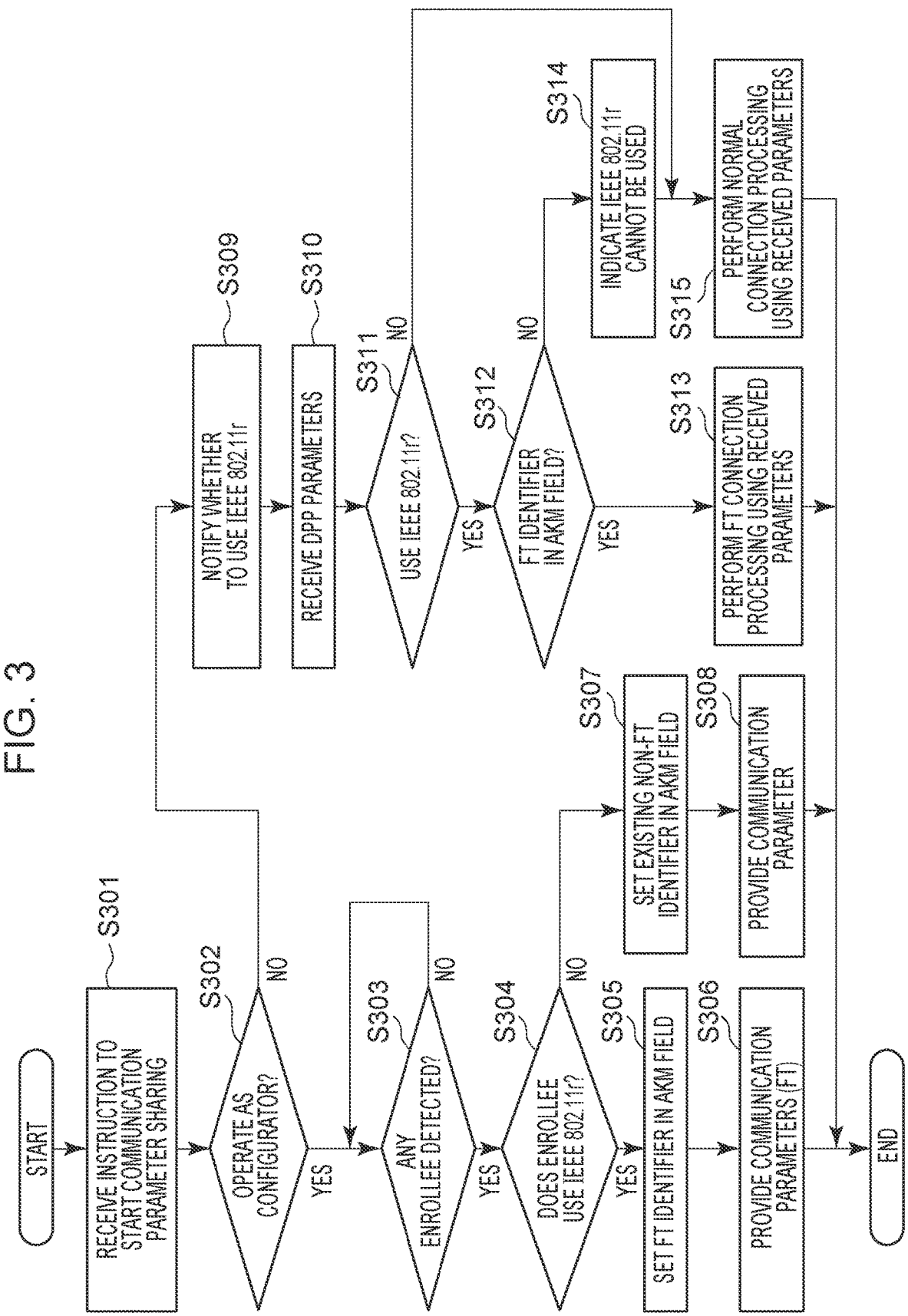
FIG. 3 is a flowchart implemented by a communication apparatus.

FIG. 3 is a flowchart illustrating processing implemented when a communication apparatus is powered on and a program stored in the storage unit 201 is read and executed by the control unit 202. The processing illustrated in FIG. 3 may be implemented not when the communication apparatus is powered on. Instead, the processing may be implemented when the communication apparatus enters a predetermined operation mode, such as a communication setting mode, in response to a user operation, or may be implemented when a predetermined application, such as a communication setting application, is started. Since both the communication apparatus 101 and the communication apparatus 102 implement the flowchart of FIG. 3 in the present embodiment, their reference numerals will be omitted in the description of the flowchart.

At least part of the flowchart of FIG. 3 may be implemented by hardware. For hardware implementation, for example, a dedicated circuit may be automatically generated, by using a predetermined compiler, on a field programmable gate array (FPGA) from a program for implementing each step. Like an FPGA, a gate array circuit may be formed for hardware implementation. The flowchart may be implemented by an application-specific integrated circuit (ASIC). In this case, each block in the flowchart may be regarded as a hardware block. A plurality of blocks may be configured as a single hardware block, or a single block may be configured as a plurality of hardware blocks. The flowchart may be implemented as a communication system composed of more than one apparatus.

First, the communication apparatus waits for an instruction from the user to start communication parameter sharing using the DPP (S301). Here, the communication apparatus receives an instruction to start communication parameter sharing from the user through the input unit 204. The input unit 204 may be a hardware button, or may be a button in a user interface (UI) displayed by the output unit 205. The communication apparatus may be configured to receive an instruction to start communication parameter sharing from an external device (not shown), such as a remote control for infrared communication. The communication apparatus starts DPP processing upon receiving the instruction to start communication parameter sharing.

The control unit 202 of the communication apparatus determines whether the communication apparatus operates as a configurator that provides communication parameters or as an enrollee that receives communication parameters in accordance with the DPP (S302). The role of the communication apparatus may be determined by asking the user in step S302, or may be set in advance by the user or an application.

If the roles of the communication apparatus 101 and the communication apparatus 102 are already determined, or if the communication apparatus 101 and the communication apparatus 102 each originally have the function of only one role, the process may skip step S302. That is, the communication apparatus 101 operating as a configurator may move straight from step S301 to step S303 without performing step S302. Also, the communication apparatus 102 operating as an enrollee may move straight from step S301 to step S309 without performing step S302.

If the communication apparatus operates as a configurator (Yes in S302), the process proceeds to step S303, whereas if the communication apparatus operates as an enrollee (No in S302), the process proceeds to step S309. If operating as a configurator (Yes in S302), the communication apparatus determines whether there is any enrollee nearby. Specifically, the communication apparatus performs DPP Bootstrapping and DPP Authentication with another communication apparatus (or second communication apparatus) using the communication unit 206. By thus acquiring Network Role information indicating whether the second communication apparatus is a configurator or an enrollee, the communication apparatus determines whether there is any enrollee nearby.

DPP Bootstrapping involves sharing public keys between the configurator and the enrollee. In DPP Bootstrapping, the public keys may be shared by Public Key Exchange (hereinafter referred to as PKEX) compliant with the DPP standard and an Internet Engineering Task Force (IETF) draft standard, or may be shared using quick response codes or QR codes (registered trademark).

If there is any enrollee nearby, that is, if the communication apparatus detects an enrollee (Yes in S303), the process proceeds to step S304. On the other hand, if there is no enrollee nearby (No in S303), the communication apparatus repeats the operation in step S303.

If there is any enrollee nearby (Yes in S303), the communication apparatus determines whether the enrollee uses the IEEE 802.11r (S304). As a method for determining whether the enrollee uses the IEEE 802.11r, the communication apparatus may use a DPP Configuration Request transmitted from the enrollee. For example, on the basis of a Wi-Fi Technology element indicating the type of wireless communication and included in the DPP Configuration Request, the communication apparatus can determine that the enrollee uses the IEEE 802.11r. Alternatively, for example, on the basis of a Network Role element indicating role information, the communication apparatus can determine that the enrollee uses the IEEE 802.11r. Including information allowing a determination that the IEEE 802.11r is used, is also referred to as including an IEEE 802.11r element.

From capability information included in a management frame compliant with the IEEE 802.11 standard and transmitted from an enrollee, the communication apparatus may determine whether the enrollee supports the IEEE 802.11r. That is, if the enrollee supports the IEEE 802.11r, the communication apparatus determines that the enrollee uses the IEEE 802.11r, whereas if the enrollee does not support the IEEE 802.11r, the communication apparatus determines that the enrollee does not use the IEEE 802.11r. Note that the management frame described above is, for example, a Probe Request, a Probe Response, a beacon, or an action frame.

If the enrollee uses the IEEE 802.11r (Yes in S304), the communication apparatus moves to step S305, whereas if the enrollee does not use the IEEE 802.11r (No in S304), the communication apparatus moves to step S307.

If the enrollee uses the IEEE 802.11r, the communication apparatus sets, in an Authentication and Key Management (AKM) field included in a DPP Configuration Response, identification information indicating that communication parameters to be provided are communication parameters for the IEEE 802.11r (S305). The communication parameters for the IEEE 802.11r refer to communication parameters that allow connection processing compliant with the IEEE 802.11r standard (FT connection processing). As the identification information described above, an FT identifier, such as "dpp-ft", may be used. The communication apparatus can thus show the enrollee that communication parameters to be provided are communication parameters that can be used in connection processing compliant with the IEEE 802.11r standard.

The communication apparatus then provides the enrollee with a frame including the AKM field and communication parameters required for FT connection (S306). The communication parameters include information required for generating a PMK in accordance with the FT initial mobility domain association. Specifically, the information is key information required for generating a PMK-R0 used in an R0 Key Holder (hereinafter referred to as R0KH) used in common in the IEEE 802.11r domain. The key information may be a PSK or a Master Session Key (hereinafter referred to as MSK), or may be a DPP Connector. Thus, with a method compliant with the DPP standard, the communication apparatus can provide the enrollee with communication parameters that can be used in connection processing compliant with the IEEE 802.11r standard.

The description returns to the branch in step S304. If the enrollee does not use the IEEE 802.11r (No in S304), the communication apparatus sets, in the AKM field, identification information not representing a communication parameter for the IEEE 802.11r (S307). For example, a non-FT identifier, such as "psk", "dpp", "sae", or "psk+sae", is set. Then, the communication apparatus sends a necessary communication parameter from the communication unit 206 to the enrollee (S308). Note that if psk, sae, or psk+sae is set in the AKM field, the necessary communication parameter is a PSK compliant with the DPP standard, or a Wi-Fi Protected Access II (WPA2) Passphrase and/or Simultaneous Authentication of Equals (SAE) password parameter. If dpp is set in the AKM field, the necessary communication parameter is a Connector compliant with the DPP standard.

Next, the description will be given of the case where the communication apparatus operates as an enrollee (No in S302). In this case, the communication apparatus notifies the configurator, using the communication unit 206, of whether the own apparatus uses the IEEE 802.11r (S309). The determination as to whether the own apparatus uses the IEEE 802.11r may be made on the basis of the functions of the own apparatus, or may be set by the user or an application.

If the own apparatus uses the IEEE 802.11r, the notification can be made, for example, by including an IEEE 802.11r element in the Wi-Fi Technology element included in the DPP Configuration Request. On the other hand, if the own apparatus does not use the IEEE 802.11r, the notification can be made by not including an IEEE 802.11r element in the Wi-Fi Technology element.

Also, the notification indicating that the own apparatus uses the IEEE 802.11r may be made, for example, by including an IEEE 802.11r element in the Network Role element. If the own apparatus does not use the IEEE 802.11r, the notification may be made by not including an IEEE 802.11r element in the Network Role element.

Also, for the notification, for example, information as to whether the own apparatus supports the IEEE 802.11r may be included in capability information in a management frame compliant with the IEEE 802.11 standard.

Then, with a method compliant with the DPP standard, the communication apparatus receives communication parameters from the configurator (S310). The communication apparatus then determines whether to use the IEEE 802.11r for connection to the wireless network (S311). If the communication apparatus uses the IEEE 802.11r (Yes in S311), the process proceeds to step S312, whereas if the communication apparatus does not use the IEEE 802.11r (No in S311), the process proceeds to step S315.

In the case of using the IEEE 802.11r (Yes in S311), the communication apparatus determines whether, in the AKM field, identification information indicating that communication parameters to be provided are communication parameters for the IEEE 802.11r is set (S312). If the identification information is set (Yes in S312), the process proceeds to step S313, whereas if the identification information is not set (No in S312), the process proceeds to step S314.

If the identification information is set (Yes in S312), the communication apparatus performs FT connection processing using the communication parameters received from the configurator (S313). The communication apparatus determines which of a PSK, an MSK, and a DPP Connector is key information included in the communication parameters received from the configurator. If the key information is a DPP Connector, the communication apparatus performs DPP Network Introduction using the communication unit 206 and checks the consistency of the Connector to generate a PMK. The communication apparatus then generates, using the generated PMK, a PMK-R0 used in the R0KH used in common in the IEEE 802.11r domain. The PMK-R0 is generated by performing FT initial mobility domain association. A wireless connection is thus completed. If the key information is a PSK, the communication apparatus skips the DPP Network Introduction and performs 4-way handshake to complete the wireless connection.

If the identification information is not set (No in S312), the communication apparatus moves to step S314 and notifies the user, using the output unit 205, that the received communication parameters cannot use the IEEE 802.11r (S314). The notification is made, for example, by displaying the corresponding message in the output unit 205. A message asking the user to select whether to continue the wireless connection processing may be displayed at the same time. If rejection information sent by the user through the input unit 204 is detected, the communication apparatus may perform error processing. After performing step S314 or determining that the own apparatus does not use the IEEE 802.11r (No in S311), the communication apparatus performs non-FT connection processing compliant with the IEEE 802.11 standard using the received communication parameters (S315).

The communication apparatus determines which of a PSK and a DPP Connector is the key information required for generating a PMK and included in the communication parameters received from the configurator. If the key information is a DPP Connector, the communication apparatus performs DPP Network Introduction using the communication unit 206 and checks the consistency of the Connector to generate a PMK. The communication apparatus then performs 4-way handshake using the communication unit 206 to complete the wireless connection. If the key information is a PSK, the communication apparatus skips the DPP Network Introduction and performs 4-way handshake to complete the wireless connection.

In the communication apparatus 101 and the communication apparatus 102 that perform the processing described above, the communication apparatus 101 provides the communication apparatus 102 with communication parameters to establish wireless connection therewith. A series of operations performed to establish the wireless connection will now be further described.

FIG. 4 is a sequence diagram illustrating interactions that take place between the communication apparatus 101 and the communication apparatus 102 until wireless connection is established therebetween. For the wireless connection, the communication apparatus 101 provides the communication apparatus 102 with communication parameters including IEEE 802.11r key information in a DPP Connector.

First, upon receiving from the user an instruction to start communication parameter sharing through the input unit 204 (S401), the communication apparatus 102 starts DPP processing. Similarly, upon receiving from the user an instruction to start communication parameter sharing through the input unit 204 (S402), the communication apparatus 101 starts DPP processing.

Then, the communication apparatus 101 and the communication apparatus 102 perform DPP Bootstrapping using the communication unit 206 to share public keys (S403). DPP Bootstrapping may be performed by PKEX, or public keys may be shared using a QR code method. In the case of using a QR code method, one of the communication apparatus 101 and the communication apparatus 102 displays a QR code including public key information by using the output unit 205, and the other communication apparatus reads the displayed QR code, so that their public keys are shared.

Next, the communication apparatus 101 and the communication apparatus 102 perform DPP Authentication to validate each other (S404).

When using the IEEE 802.11r, the communication apparatus 102 includes an IEEE 802.11r element in a Wi-Fi Technology element included in the DPP Configuration Request (S405). The IEEE 802.11r element may be included in a Network Role element. The communication apparatus 102 then transmits the DPP Configuration Request including the Wi-Fi Technology element using the communication unit 206 (S406). Upon receiving the DPP Configuration Request using the communication unit 206, the communication apparatus 101 determines whether the communication apparatus 102 uses the IEEE 802.11r.

Since the communication apparatus 102 uses the IEEE 802.11r, the communication apparatus 101 sets identification information representing communication parameters for the IEEE 802.11r in an AKM field included in a DPP Configuration Response (S407). Regardless of whether the communication apparatus 102 supports the IEEE 802.11r, the communication apparatus 101 may set identification information representing communication parameters for the IEEE 802.11r in the AKM field included in the DPP Configuration Response. In this case, communication parameters to be provided are communication parameters required for FT connection.

Then, the communication apparatus 101 transmits the DPP Configuration Response to the communication apparatus 102 (S408). The DPP Configuration Response is a frame that includes the AKM field in which the identification information is set and the communication parameters required for FT connection.

The communication parameters include key information required for generating a PMK in accordance with FT initial mobility domain association. Specifically, the key information is information required for generating a PMK-R0 used in an R0KH used in common in the IEEE 802.11r domain. The key information may be a PSK or an MSK, or may be a DPP Connector.

The key information is used in XXKey when R0-Key-Data is determined by the following equations:

R0-Key-Data=KDF-Hash-Length(XXKey, "FT-R0", SSIDlength‖SSID‖MDID‖R0KHlength‖R0KH-ID-‖SOKH-ID);

PMK-R0=L(R0-Key-Data, 0, Q);

PMK-R0Name-Salt=L(R0-Key-Data, Q, 128); and

Length=Q+128.

XXKey represents key information and stores therein a PSK or an MSK. SSIDlength represents the length of an SSID, and MDID represents a Mobility domain identifier. R0KHlength represents the length of an R0KH-ID, R0KH-ID represents identifier information of an Authenticator (access point), and SOKH-ID represents a media access control (MAC) address of a supplicant. Q stores a hash length of 256 or 384. KDF-Hash-Length represents a key derivation function (KDF) and acquires the length of a derived key on the basis of key information, a label, and a key information identifier.

The communication apparatus 101 provides the communication apparatus 102 with communication parameters including information used in the XXKey to determine R0-Key-Data in the equation for PMK-R0.

The communication apparatus 102 displays, using the output unit 205, a message to the user to indicate whether the received communication parameters can use the IEEE 802.11r (S409). A message asking the user to select whether to continue the wireless connection processing may be displayed at the same time. If rejection information sent by the user through the input unit 204 is detected, the communication apparatus 102 may perform error processing without performing wireless connection with the communication apparatus 101.

If the communication apparatus 101 includes IEEE 802.11r key information in the DPP Connector, the communication apparatus 102 starts a Network Introduction protocol using the communication unit 206. In the Network Introduction protocol, first, the communication apparatus 102 transmits a Peer Discovery Request using the communication unit 206 (S410). The Peer Discovery Request includes a Transaction ID and Connector information.

On the basis of the received information, the communication apparatus 101 checks the consistency of the Connector and generates a PMK. The PMK is generated by the following equations:

$N=nk*PK;$ $PMK=HKDF(< >,\text{"DPP PMK"},N \cdot x);$ and $PMKID=\text{Truncate-128}(SHA256(\min(NK \cdot x,PK \cdot x) | \max(NK \cdot x,PK \cdot x))).$ Note that nk represents a net access key, and PK represents a public net provision key.

The communication apparatus 101 transmits a Peer Discovery Response using the communication unit 206 (S411). The Peer Discovery Response includes a Transaction ID, a Connector, and DPP Status information.

Similarly, the communication apparatus 102 checks the consistency of the Connector and generates a PMK on the basis of the received information. The PMK is generated by the following equations:

$N=pk*NK;$ $PMK=HKDF(< >,\text{"DPP PMK"},N \cdot x);$ and $PMKID=\text{Truncate-128}(SHA256(\min(PK \cdot x,NK \cdot x) | \max(PK \cdot x,NK \cdot x))).$ If, for example, the communication apparatus 101 includes IEEE 802.11r key information in credentials, not in the DPP Connector, the Network Introduction protocol in steps S410 and S411 is omitted.

The communication apparatus 101 and the communication apparatus 102 then perform 802.11 Authentication (S412). When performing IEEE 802.11r connection, the communication apparatus 101 and the communication apparatus 102 perform connection processing in accordance with the FT initial mobility domain association. The communication apparatus 102 transmits an Association Request using the communication unit 206 (S413). For IEEE 802.11r wireless connection, the communication apparatus 102 includes a Mobility Domain element (hereinafter referred to as MDE) in the Association Request. The communication apparatus 101 transmits an Association Response using the communication unit 206 (S414). For IEEE 802.11r wireless connection, the communication apparatus 101 includes an MDE and a fast BSS transition element (hereinafter referred to as FTE) in the Association Response.

If IEEE 802.11r key information is included in the DPP Connector, the communication apparatus 101 and the communication apparatus 102 set, in the XXKey of the R0-Key-Data, the PMK generated in steps S410 and S411 for FT connection. If IEEE 802.11r key information is included in credentials, the communication apparatus 101 and the communication apparatus 102 set the received PSK or MSK in the XXKey of the R0-Key-Data.

For FT connection, the communication apparatus 101 and the communication apparatus 102 perform FT 4-way handshake using the communication unit 206 (S415). FT 4-way handshake is 4-way handshake compliant with the IEEE 802.11r standard. FT 4-way handshake allows generation and verification of a PMK, and generation of a Pairwise Transient Key (hereinafter referred to as PTK). Specifically, a PMK-R0 used in the R0KH is generated. Then, a PMK-R1 used in an R1 Key Holder (R1KH) unique to each device is generated on the basis of the PMK-R0, and a PTK unique to each session is generated on the basis of the PMK-R1.

If the communication apparatus 101 and the communication apparatus 102 do not perform IEEE 802.11r wireless connection, they perform normal 802.11 Association processing, instead of the operations in steps S413, S414, and S415. The communication apparatus 101 and the communication apparatus 102 then perform 4-way handshake to generate and verify the PMK and generate the PTK on the basis of the PSK or MSK. The communication apparatus 101 and the communication apparatus 102 thus complete wireless connection using the communication unit 206 (S416).

As described above, the present embodiment allows sharing of communication parameters for connection to a wireless network compliant with the IEEE 802.11r standard in accordance with the DPP and improves user convenience.

The communication parameters may be used to create a wireless network, instead of being used for connection to a wireless network. The wireless network created in this manner allows FT connection processing.

The present invention can also be implemented by processing in which a program performing at least one of the functions of the embodiments described above is supplied to a system or apparatus via a network or storage medium and at least one processor in a computer of the system or apparatus reads and executes the program. The present invention can also be implemented by a circuit (e.g., ASIC) that performs the at least one function.

In processing for sharing communication parameters compliant with the DPP standard, the present invention makes it possible to share communication parameters that allow connection processing compliant with the IEEE 802.11r standard.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A first communication apparatus comprising:
creating a provisioning frame for provisioning a second communication apparatus in accordance with a Device Provisioning Protocol (DPP) standard, the provisioning frame including an Authentication and Key Management (AKM) field in accordance with the DPP standard;
setting the AKM field to first identification information, wherein in a case where the second communication apparatus performs connection processing compliant with an Institute of Electrical and Electronics Engineers (IEEE) 802.11r standard, the first identification information indicates that a first communication parameter being provided in the provisioning frame is a communication parameter for executing connection processing compliant with the IEEE 802.11r standard, wherein instead of the AKM field being set to any of a plurality of predetermined AKM parameter values defined by the DPP standard, the first identification information to which the AKM field is set, includes information not predefined by the DPP standard;
including the first communication parameter in the provisioning frame; and
transmitting the provisioning frame to the second communication apparatus.

2. The first communication apparatus according to claim 1, wherein the operations further comprise acquiring information from the second communication apparatus, the information indicating that the second communication apparatus performs connection processing compliant with the IEEE 802.11r standard,
wherein the setting unit sets the first identification information in the AKM field in a case where the acquiring acquires the information indicating that the second communication apparatus performs connection processing compliant with the IEEE 802.11r standard.

3. The first communication apparatus according to claim 2, the operations further comprising receiving a Device Provisioning Protocol Configuration Request from the second communication apparatus, wherein the acquiring acquires, based on information indicated by a Wi-Fi Technology element or Network Role element included in the Device Provisioning Protocol Configuration Request, the information indicating that the second communication apparatus performs connection processing compliant with the IEEE 802.11r standard.

4. The first communication apparatus according to claim 2, the operations further comprising:
receiving, from the second communication apparatus, a management frame compliant with an IEEE 802.11 standard, wherein the acquiring acquires, based on capability information included in the management frame, the information indicating that the second communication apparatus performs connection processing compliant with the IEEE 802.11r standard.

5. The first communication apparatus according to claim 2, wherein in a case where the acquiring does not acquire, from the second communication apparatus, information indicating that the second communication apparatus performs connection processing compliant with the IEEE 802.11r standard, the setting sets second identification information indicating that a communication parameter included in the provisioning frame transmitted by the transmitting unit is a second communication parameter not for executing connection processing compliant with the IEEE 802.11r standard.

6. The first communication apparatus according to claim 1, wherein the first communication parameter includes key information for generating a Pairwise Master Key R0 used in an R0 Key Holder.

7. The first communication apparatus according to claim 6, wherein the key information is one of a Pre-Shared Key, a Pairwise Master Key, and a Master Session Key.

8. The communication apparatus according to claim 1, wherein the first communication parameter is to be used by the second communication apparatus to establish a connection to the wireless network without re-executing an authentication process previously executed by the second communication apparatus in a mobility domain that the wireless network is a part of.

9. A first communication method comprising the steps of:
creating a provisioning frame for provisioning a second communication apparatus in accordance with a Device Provisioning Protocol (DPP) standard, the provisioning frame including an Authentication and Key Management (AKM) field in accordance with the DPP standard;
setting the AKM field to first identification information, wherein in a case where the second communication apparatus performs connection processing compliant with an Institute of Electrical and Electronics Engineers (IEEE) 802.11r standard, the first identification information indicates that a first communication parameter being provided in the provisioning frame is a communication parameter for executing connection processing compliant with the IEEE 802.11r standard, wherein instead of the AKM field being set to any of a plurality of predetermined AKM parameter values defined by the DPP standard, the first identification information to which the AKM field is set, includes information not predefined by the DPP standard;
including the first communication parameter in the provisioning frame; and
transmitting the provisioning frame to the second communication apparatus.

10. The method according to claim 9, wherein the first communication parameter is to be used by the second communication apparatus to obtain secure connection to the wireless network without re-executing an authentication process previously executed by the second communication apparatus in a mobility domain that the wireless network is a part of.

11. A non-transitory computer-readable storage medium storing instructions that, when executed by a computer, cause the computer to perform a communication method, the communication method comprising the steps of:
creating a provisioning frame for provisioning a second communication apparatus in accordance with a Device Provisioning Protocol (DPP) standard, the provisioning frame including an Authentication and Key Management (AKM) field in accordance with the DPP standard;
setting the AKM field to first identification information, wherein in a case where the second communication apparatus performs connection processing compliant with an Institute of Electrical and Electronics Engineers (IEEE) 802.11r standard, the first identification information indicates that a first communication parameter being provided in the provisioning frame is a communication parameter for executing connection processing compliant with the IEEE 802.11r standard, wherein instead of the AKM field being set to any of a plurality of predetermined AKM parameter values defined by the DPP standard, the first identification information to which the AKM field is set, includes information not predefined by the DPP standard;
including the first communication parameter in the provisioning frame; and
transmitting the provisioning frame to the second communication apparatus.

* * * * *